United States Patent [19]
Nagai et al.

[11] Patent Number: 5,050,379
[45] Date of Patent: Sep. 24, 1991

[54] DISPLACEMENT OF A VARIABLE DISPLACEMET HYDRAULIC PUMP AND SPEED OF AN ENGINE DRIVING THE PUMP CONTROLLED BASED ON DEMAND

[75] Inventors: Katsumi Nagai; Teruyuki Nishimyou, both of Kariya; Masataka Osawa, Nagoya; Hitoshi Ban, Oobu, all of Japan

[73] Assignees: Kabushiki Kaisha Toyoda Jidoshokki Seisakusho, Kariya; Kabushiki Kaisha Toyota Chuo Kenkyusho, Aichi, both of Japan

[21] Appl. No.: 571,732

[22] Filed: Aug. 23, 1990

[30] Foreign Application Priority Data

Aug. 25, 1989 [JP] Japan .................................. 1-219686
Sep. 5, 1989 [JP] Japan .................................. 1-228336

[51] Int. Cl.[5] .............................................. F16D 31/00

[52] U.S. Cl. ........................................ 60/368; 60/422; 60/423; 60/427; 60/428; 60/434; 60/435; 60/449

[58] Field of Search ................. 60/328, 368, 422, 423, 60/427, 428, 432, 434, 435, 449, 484; 417/15; 180/132, 141

[56] References Cited

U.S. PATENT DOCUMENTS

| | | | |
|---|---|---|---|
| 3,579,987 | 5/1971 | Busse | 60/368 |
| 3,875,747 | 4/1975 | Briggs | 60/422 |
| 4,103,489 | 8/1978 | Fletcher et al. | 60/452 |
| 4,534,707 | 8/1985 | Mitchell | 60/431 |
| 4,537,029 | 8/1985 | Gunda et al. | 91/516 |
| 4,644,749 | 2/1987 | Somes | 60/464 |
| 4,658,584 | 4/1987 | Suzuki et al. | 60/450 |
| 4,712,376 | 12/1987 | Hadank et al. | 60/428 |
| 4,727,490 | 2/1988 | Narita et al. | 60/431 |
| 4,744,218 | 5/1988 | Edwards et al. | 91/361 |
| 4,768,339 | 9/1988 | Aoyagi et al. | 60/428 |
| 4,967,577 | 11/1990 | Izumi et al. | 60/431 |

FOREIGN PATENT DOCUMENTS

| | | |
|---|---|---|
| 60-96397 | 7/1985 | Japan . |
| 60-191704 | 12/1985 | Japan . |

*Primary Examiner*—Edward K. Look
*Assistant Examiner*—F. Daniel Lopez
*Attorney, Agent, or Firm*—Brooks Haidt Haffner & Delahunty

[57] ABSTRACT

A controller for a hydraulic fluid flow control apparatus determines a quantity necessary for loading/unloading operations according to a signal from a lever operating degree detector, and controls a variable displacement type hydraulic pump to obtain the quantity. Accordingly, unnecessary hydraulic fluid flow in the hydraulic apparatus is reduced. The controller determines when a vehicle is stopped according to a signal from a clutch ON-OFF detector or a neutral sensor, and can raise the rpm of an engine. Therefore, when the loading/unloading operations are being executed while the vehicle is stopped, there is no need to operate the accelerator pedal.

16 Claims, 11 Drawing Sheets

DISPLACEMENT OF A VARIABLE DISPLACEMET HYDRAULIC PUMP AND SPEED OF AN ENGINE DRIVING THE PUMP CONTROLLED BASED ON DEMAND

FIELD OF THE INVENTION

This invention relates to a hydraulic apparatus used for industrial vehicles such as a fork lift truck, a shovel loader, etc. and, more particularly, to an apparatus for controlling the flow rate of hydraulic fluid or oil discharged from a hydraulic pump.

BACKGROUND OF THE INVENTION

FIG. 1 shows a general conventional hydraulic apparatus in a fork lift truck. In this hydraulic apparatus, an engine 2 drives a hydraulic pump 4 to feed under pressure hydraulic fluid in an oil tank to a control valve unit 8 and to tilt loading/unloading control levers 10 and 12 of the control valve unit 8, thereby supplying or discharging a necessary quantity of hydraulic fluid to or from a lift cylinder 14 or a tilt cylinder 16. A fixed flow type flow divider (not shown) is provided in the control valve unit 8, and a driving control system circuit 18 comprising a brake booster 20, a clutch booster 22 and a power steering gear box 24, etc. is connected to the fixed flow outlet of the fixed flow type flow divider.

Heretofore, since the hydraulic pump 4 has been a fixed displacement type, the discharge quantity $Q_0$ of the hydraulic pump 4 is always constant if the rpm of the engine 2 is constant. Since the flow divider in the control valve unit 8 is a fixed flow type, the quantity $Q_1$ of the hydraulic fluid to be supplied to the driving control system circuit 18 is constant irrespective of loading-/unloading operations. The discharge quantity $Q_0$ of the hydraulic pump 4 is set to a value obtained by adding the quantity $Q_1$ of the hydraulic fluid to be supplied to the driving control system circuit 18 and the maximum quantity $Q_{2\,max}$ of the quantities $Q_{2\,L}$, $Q_{2\,T}$ of the hydraulic fluid to be supplied to the lift cylinder 14 or the tilt cylinder 16 in case of loading/unloading operations. Accordingly, as schematically shown in FIG. 2, when the operating distances of the loading and unloading control levers 10 and 12 are short and the quantities $Q_{2\,L}$, $Q_{2\,T}$ of the hydraulic fluid necessary for the loading-/unloading operations are small, the excessive quantity of the hydraulic fluid not used for the loading/unloading operations is returned from the control valve unit 8 to the oil tank 6 through a drain tube 26. Particularly when the loading/unloading operations are not executed at all, the total quantity $Q_{2\,max}$ of hydraulic fluid is returned as excessive quantity to the oil tank. The energy loss of the excessive quantity of hydraulic fluid introduces the problems of a rise in hydraulic fluid temperature and increased fuel consumption.

SUMMARY OF THE INVENTION

Accordingly, a primary object of this invention is to provide a hydraulic fluid flow control apparatus for controlling the flow rate of hydraulic fluid to be discharged from a hydraulic pump as required. More specifically, an object of this invention is to provide a hydraulic fluid flow control apparatus for controlling the discharge quantity of hydraulic fluid from a hydraulic pump in accordance with the flow rate of the hydraulic fluid by obtaining the flow rate of the hydraulic fluid necessary for a loading or unloading operation in response to the amount of operation of a loading/unloading control lever.

When loading/unloading operations are performed while a vehicle is stopped, it has heretofore been necessary to raise the rpm of the engine by pressing the accelerator pedal, complicating operation. Therefore, another object of this invention is to provide a hydraulic fluid flow control apparatus for performing loading/unloading operations even when an acclerator pedal is not depressed.

A hydraulic fluid flow control apparatus according to a first aspect of the present invention comprises a variable displacement type hydraulic pump, a lever operating degree detector for detecting the degree of operation of a loading/unloading control lever, a controller outputtting a signal for varying discharge capacity per one revolution of the hydraulic pump so as to increase the discharge quantity of hydraulic fluid from the hydraulic pump by the quantity necessary for loading/unloading operations in response to a signal from the lever operating degree detector, and displacement varying means for varying the displacement in accordance with a signal from the controller.

In the arrangement of the hydraulic fluid flow control apparatus described above, the quantity necessary for the hydraulic apparatus is obtained from the operating degree of the control lever, and the variable displacement hydraulic pump can be controlled so as to discharge that quantity of hydraulic fluid. Accordingly, hydraulic fluid not required to flow in the hydraulic apparatus can be reduced.

The hydraulic fluid flow control apparatus according to a second aspect of the present invention comprises, in addition to the constituents described above, an engine for driving the hydraulic pump, a transmission for converting the output of the engine into a power for driving a vehicle, a throttle actuator for regulating fuel supply quantity to the engine, an engine rpm detector for the rpm of the engine, a clutch ON-OFF sensor for detecting the ON or OFF of a clutch or a neutral sensor for detecting whether or not the transmission is in neutral, and a controller outputting a signal of the operating degree of the throttle actuator so as to raise the rpm of the engine to a predetermined value in response to the signals from the engine rpm detector and the lever operating degree sensor when it is determined that the clutch is OFF or disengaged or that the transmission is in neutral and further when a tilting operation of the loading/unloading control lever is determined in response to the output signals from the clutch ON-OFF sensor or the neutral sensor and the output signal from the lever operating degree sensor.

According to the arrangement described above, in the case that loading/unloading operations are executed when the vehicle is stopped, the stopped state of the vehicle is determined by detecting whether or not the clutch is ON or the transmission is in neutral, and the rpm of the engine is automatically raised to eliminating the need to depress the accelerator pedal.

These and other objects and features of the present invention will become apparent from the following detailed description in conjunction with the attached drawings.

DETAILED DESCRIPTION OF THE PREFERRED EMBODIMENT

Figure 1:
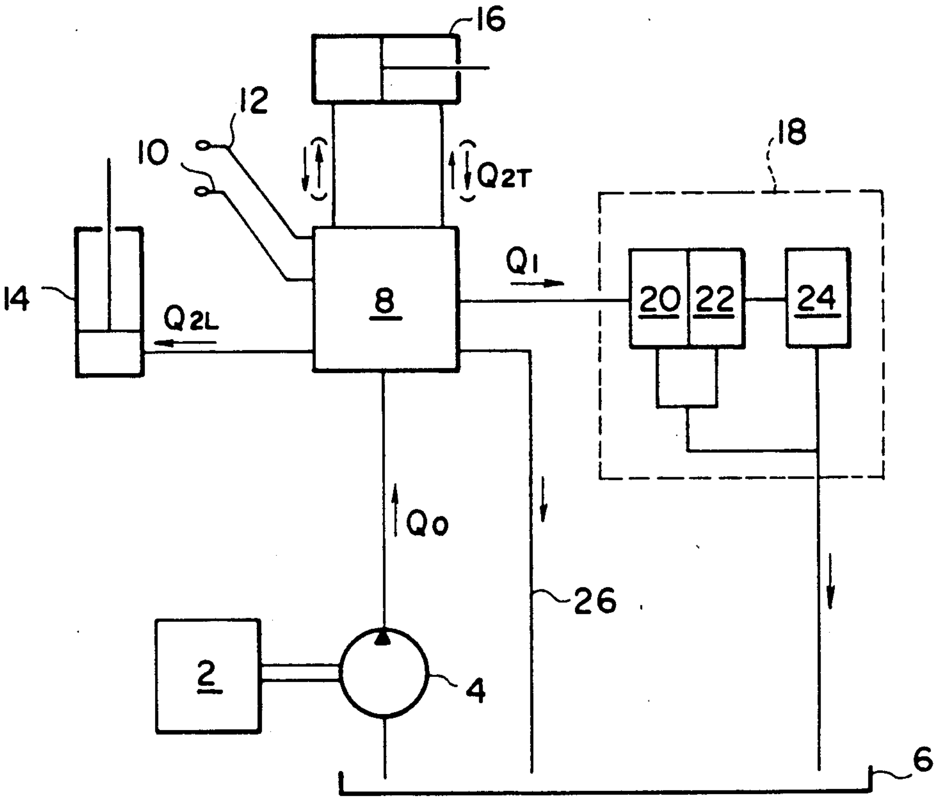
FIG. 1 PRIOR ART
FIG. 1 is a circuit diagram of a conventional hydraulic apparatus of a fork lift truck.
Figure 2:
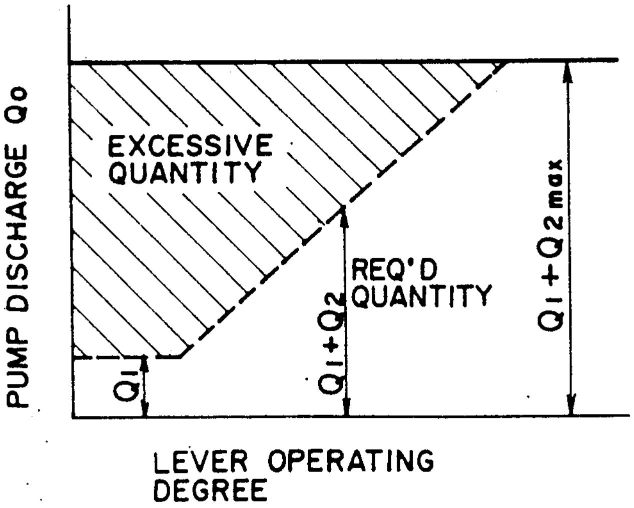
FIG. 2 PRIOR ART
FIG. 2 is a graph showing the relationship between a lever operating degree and the discharge quantity of a pump in a conventional hydraulic apparatus.
Figure 3:
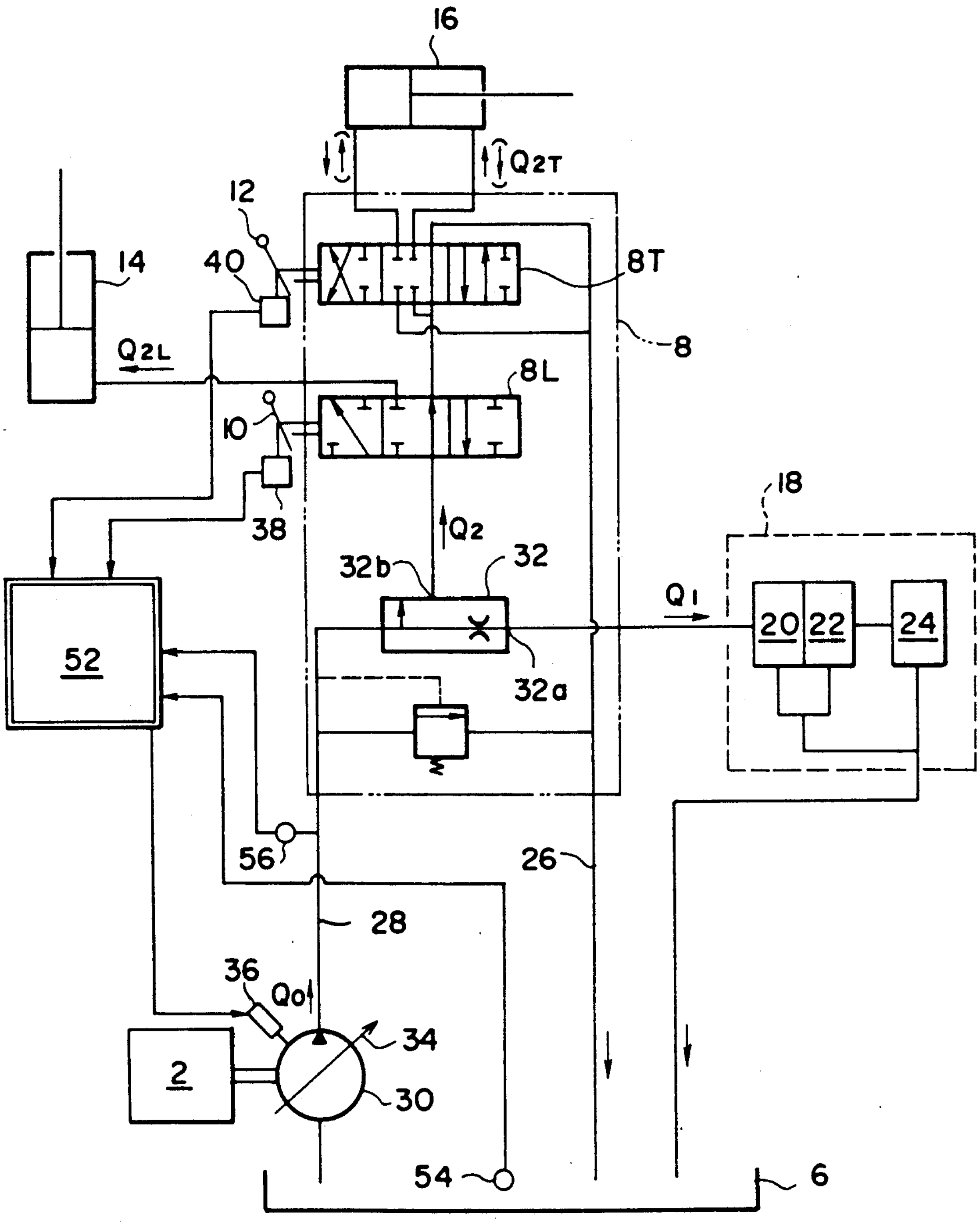
FIG. 3 is a circuit diagram of a hydraulic apparatus for a fork lift truck to which a first embodiment of this invention is applied.

Referring to the drawings and particularly to FIG. 3, a hydraulic apparatus for a fork lift truck constructed according to a first embodiment of the present invention is shown. This hydraulic apparatus comprises an oil tank 6, a hydraulic pump 30 driven by an engine 2, a fixed flow type flow divider 32 in a control valve unit 8 connected to the discharge port of the hydraulic pump 30, and a driving control system circuit 18 having a brake booster 20 connected to the fixed flow outlet 32*a* of the flow divider 32, a clutch booster 22 and a power steering gear box 24. An excess flow outlet 32*b* of the flow divider 32 communicates with a lift control valve 8L and a tilt control valve 8T, which are respectively connected to a lift cylinder 14 and a tilt cylinder 16. The flow divider 32 opens the excessive flow outlet 32*b* and supplies hydraulic fluid to the lift and tilt control valves 8L and 8T when the discharge quantity $Q_0$ of the hydraulic pump exceeds a predetermined quantity $Q_1$ for a driving control system circuit 18. These arrangements are substantially the same as those of the conventional apparatus, but the hydraulic pump 30 of the present invention is a variable displacement type. In the embodiment shown, a swash plate type radial plunger pump is employed as the variable displacement type hydraulic pump 30, and the angle of a swash plate 34 is regulated by a displacement varying mechanism 36 thereby to vary discharge capacity per one revolution of the pump.

Figure 4:
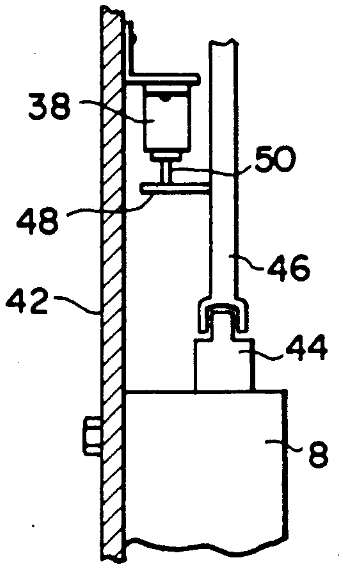
FIG. 4 is a schematic explanatory view showing the mounting method of a potentiometer of a lever operating degree sensor.

Lift and tilt control levers 10 and 12 are connected to the control valves 8L and 8T, respectively, and they are tilted to supply or discharge a necessary quantity of hydraulic fluid to the lift and tilt cylinders 14 and 16. Potentiometers 38 and 40 are provided as lever operating degree sensors for detecting the operating degrees of the control levers 10 and 12, respectively. The mounting of the potentiometers 38 and 40 may be executed by any of known means. For example, as shown in FIG. 4, means whereby the potentiometer 38 is fixed to a frame 42 in the vicinity of the control valve unit 8, an arm 48 is welded to a rod 46 between the control lever 10 and the spools 44 of the control valves 8T and 8L, and the arm 48 is coupled to the movable shaft 50 of the potentiometer 38 may be considered. In this case, when the control levers 10 and 12 are tilted, their movements are transmitted to the movable shaft 50 of the potentiometer 38 through the rod 46 and the arm 48, and signals responsive to the movements of the control levers 10 and 12 are generated from the potentiometers 38 and 40, respectively.

The potentiometers 38 and 40 are connected to the input unit of a controller (e.g., a microcomputer) 52. The output unit of the controller 52 is connected to the displacement varying mechanism 36 of the hydraulic pump 30, and the controller 52 outputs control signals to the displacement varying mechanism 36 in response to the signals from the potentiometers 38 and 40 to regulate the angle of the swash plate 34.

Figure 5:
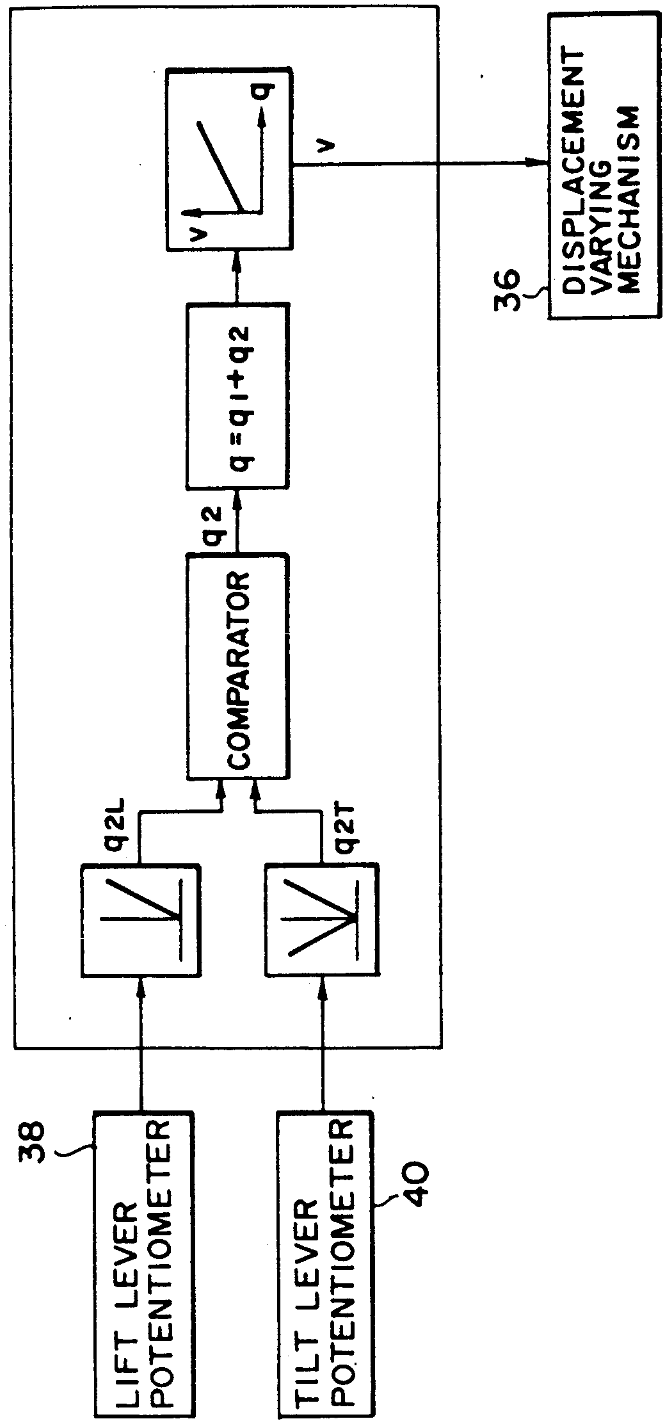
FIG. 5 is a view schematically showing a control logic in the controller shown in FIG. 3.

FIG. 5 shows the control logic of controller 52. The controller 52 receives signals corresponding to the movements of the control levers 10 and 12 from the potentiometers 38 and 40, and calculates the discharge capacities $q_{2L}$ and $q_{2T}$ per revolution required by the lift and tilt cylinder 14 and 16 from the signals. Then, a comparator compares the discharge capacities $q_{2L}$, $q_{2T}$, selects the larger of them, and determines a true discharge capacity $q_2$ necessary for loading/unloading operations. The controller further adds a discharge capacity $q_1$ per revolution corresponding to a quantity $Q_1$ for the driving control system circuit 18 to the discharge capacity $q_2$ to obtain a discharge capacity q per revolution required by the entire hydraulic apparatus, and outputs a control signal v corresponding thereto to the displacement varying mechanism 36. As a result, the angle of the swash plate 34 of the hydraulic pump 30 is regulated, and the discharge quantity $Q_0$ from the hydraulic pump 30 becomes a quantity Q necessary for loading/unloading and driving control. It is noted in this first embodiment that the engine is operated at a reference rpm $n_0$.

When loading/unloading operations are not being executed, the loading/unloading quantity $Q_2$ is zero. Accordingly, the quantity Q required by the hydraulic apparatus becomes only the quantity $Q_1$ to the driving control system circuit. Therefore, the pump discharge quantity $Q_0$ is set to $Q_1$ under the control of the controller 52.

Figure 6:
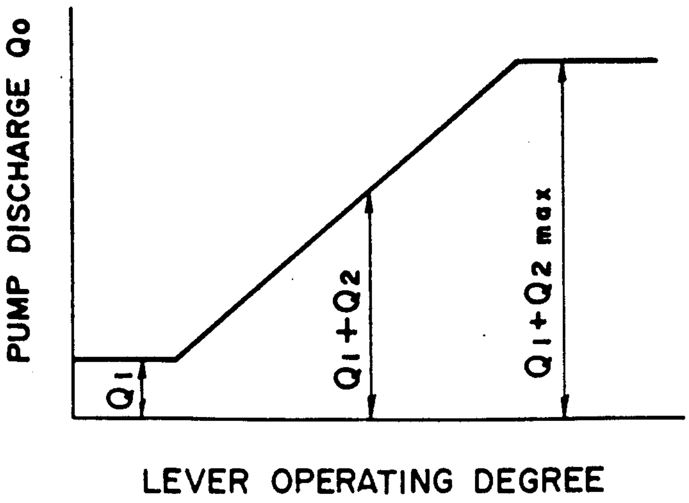
FIG. 6 is a graph showing the relationship between a lever operating degree and the discharge quantity of a pump in the first embodiment of this invention.

When the hydraulic pump 30 is controlled as described above, as schematically shown in FIG. 6 the discharge quantity $Q_0$ of the hydraulic pump 30 is increased only in accordance with the increase in the lever operating degree. Accordingly, excessive hydraulic fluid is substantially zeroed in the hydraulic appartus, and the hydraulic fluid to be returned from the control valve unit 8 through the drain tube 26 is reduced.

Since the volume of the hydraulic fluid varies according to temperature and pressure, an oil temperature indicator 54 is, for example, disposed in the oil tank 6, and a pressure indicator 56 is provided in a conduit 28 at the discharge side of the hydraulic pump 30. The detected values of the oil temp. Indicator 54 and the pressure indicator 56 are input to the controller 52 where a correction of the following equation is, for example, performed in the calculation of the discharge capacity q per revolution to supply a more accurate flow rate.

$$q' = q/(\alpha \times \beta)$$

$$v = \text{func}\ (q')$$

where q: required discharge capacity q': corrected required discharge capacity

α: temperature correction coefficient

β: pressure correction coefficient func (q'): conversion calculation function to control signal v In the embodiment described above, the rpm of the engine is predetermined and the discharge capacity q per revolution is calculated in accordance with the predetermined value. However, if the rpm of the engine 2 is not set to the reference rpm $n_0$, the discharge quantity of the pump becomes insufficient or excessive.

Figure 7:
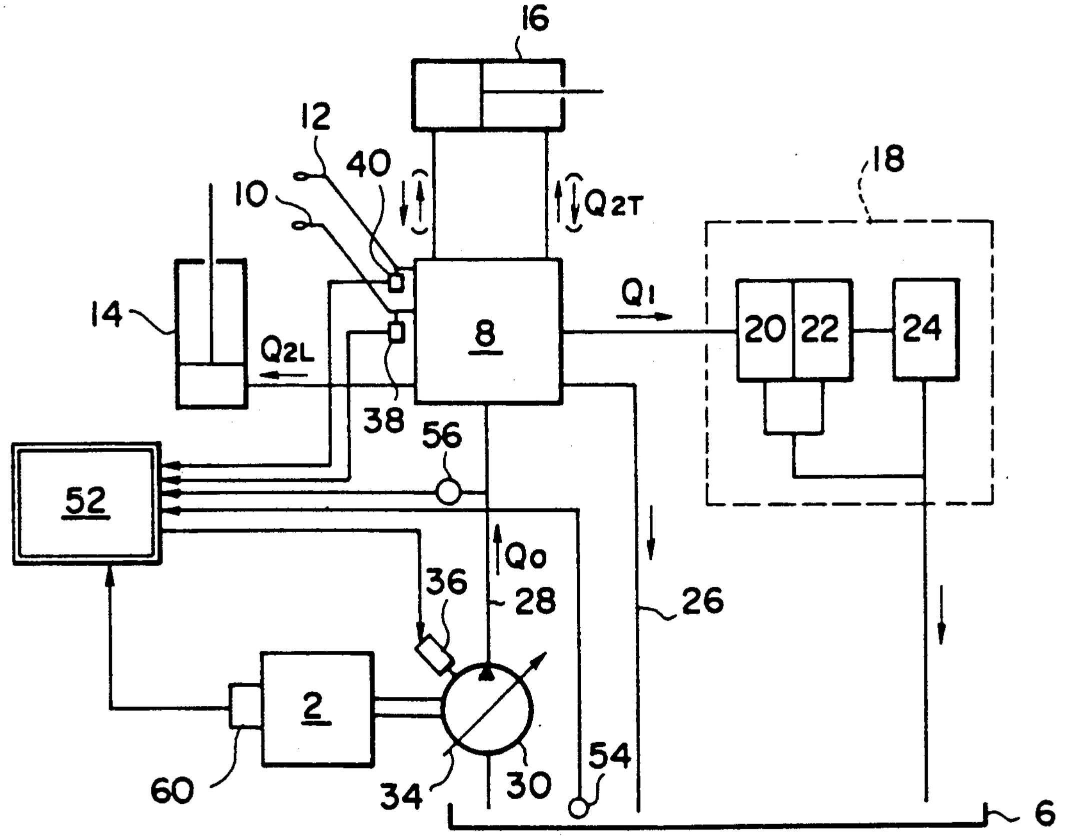
FIG. 7 is a circuit diagram of a hydraulic apparatus for a fork lift truck to which a second embodiment of this invention is applied.

Therefore, according to a second embodiment of the present invention, as shown in FIG. 7, an engine rpm detector or tachometer 60 is attached to the engine 2, and the discharge capacity q per revolution of the hydraulic pump 30 may be obtained from the rpm of the engine and the lever operating degree at the time of loading/unloading. The arrangement in FIG. 7 is the same as that of the first embodiment except for the attachment of the engine rpm detector 60, and hence only the control logic and operation of the controller 52 will be described.

Figure 8:
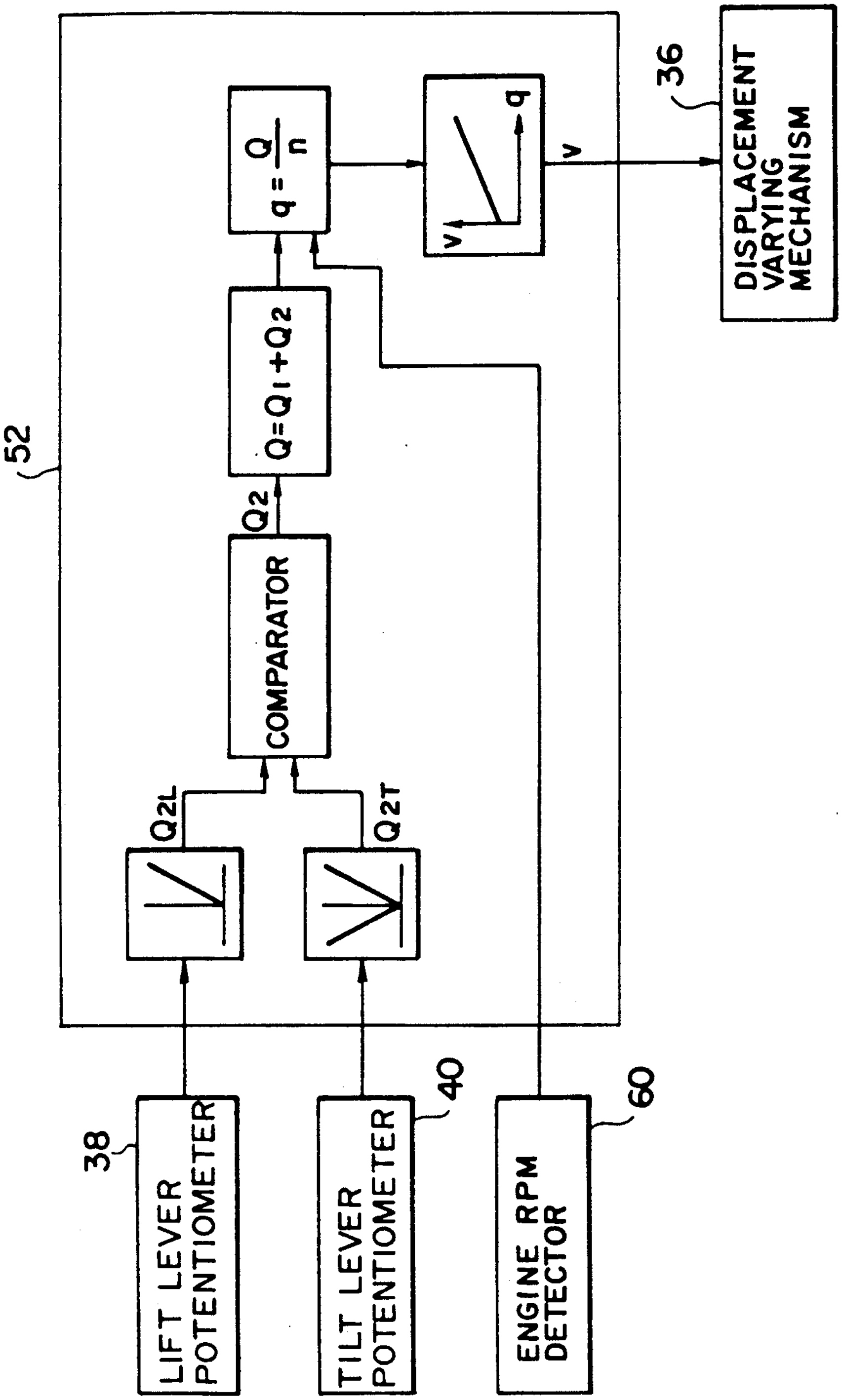
FIG. 8 is a view schematically showing a control logic in a controller shown in FIG. 7.

FIG. 8 shows the control logic of controller 52. As shown in FIG. 8, the controller 52 receives signals corresponding to the operating degrees of the control levers 10 and 12 from the potentiometers 38 and 40, respectively, and calculates the quantities $Q_{2L}$ and $Q_{2T}$ required by the lift and tilt cylinder 14 and 16 from the signals. Then, a comparator compares the quantities $Q_{2l}$, $Q_{2T}$, selects the larger quantity, and determines a true quantity $Q_2$ necessary for loading/unloading operations. The controller further adds the necessary quantity $Q_1$ required by the driving control system circuit 18 to the quantity $Q_2$ to obtain a quantity Q required by the entire hydraulic apparatus. On the other hand, the controller 52 receives a signal from the engine rpm detector 60, divides the quantity Q by the rpm n of the engine 2 to obtain a discharge capacity q per revolution of the hydraulic pump 30, and outputs a control signal v corresponding to the discharge capacity q to the displacement varying mechanism 36.

When the hydraulic pump 30 is controlled as described above, even if the engine rpm n is not the reference rpm $n_0$, a suitable quantity corresponding to the operating degrees of the control levers 10 and 12 is supplied, and excessive hydraulic fluid is effectively eliminated. Even if the rpm of the engine is less than the reference rpm $n_0$, the required quantity Q is supplied, making more rapid loading/unloading operations possible. When loading/unloading operations are not executed, the discharge quantity $Q_0$ of the pump becomes only the quantity $Q_1$ to the driving control system circuit 18, but since the quantity $Q_1$ is always controlled to a predetermined value by an rpm signal, excessive quantities upon increases in the rpm's of the engine are reduced.

In the second embodiment described above, the quantity $Q_2$ of the hydraulic fluid is set corresponding to the operating degrees of the loading/unloading levers, the quantity $Q_1$ for the driving control system circuit is added to the quantity $Q_2$, and the discharge quantity Q of the hydraulic pump is regulated. However, the regulation of the discharge quantity Q of the hydraulic pump may be combined with that of the first embodiment. More specifically, the discharge capacity $q_1$ per revolution of the hydraulic pump 30 is calculated by adding the discharge capacity $q_1$ obtain by dividing the quantity $Q_1$ supplied to the driving control system circuit 18 by the engine rpm n to the discharge capacity $q_2$ corresponding to the operating degrees of the control levers, and as the control signal v to the displacement varying mechanism 36 a value corresponding to the calculated discharge capacity q is employed. In this manner, the hydraulic pump 30 is controlled to set the quantity of the driving control system circuit 18 when loading/unloading operations are not being executed, to a predetermined value irrespective of the rpm of the engine, thereby exhibiting the effect of eliminating the excessive quantity of hydraulic fluid. An operator can control both the discharge capacity per revolution of the pump corresponding to the operating degree of the levers, i.e., the angle of the swash plate 34 and the rpm of the engine determined by the amount the acceleration is depressed. Accordingly, fine flow quantity control, i.e, smooth loading/unloading operations, continuous loading/unloading operations, etc., become possible to improve operating effeciciency.

Further, as a modified example of the second embodiment, a vehicle speed sensor is added, and may be connected to the controller 52. This modified example arose after considering the points that it is desirable to vary the quantity actually required by the driving control system circuit 18 in response to vehicle speed and that it is particularly desirable to suppress the power steering assist to a small value during high speed travel so as to prevent the vehicle from overturning.

Figure 9:
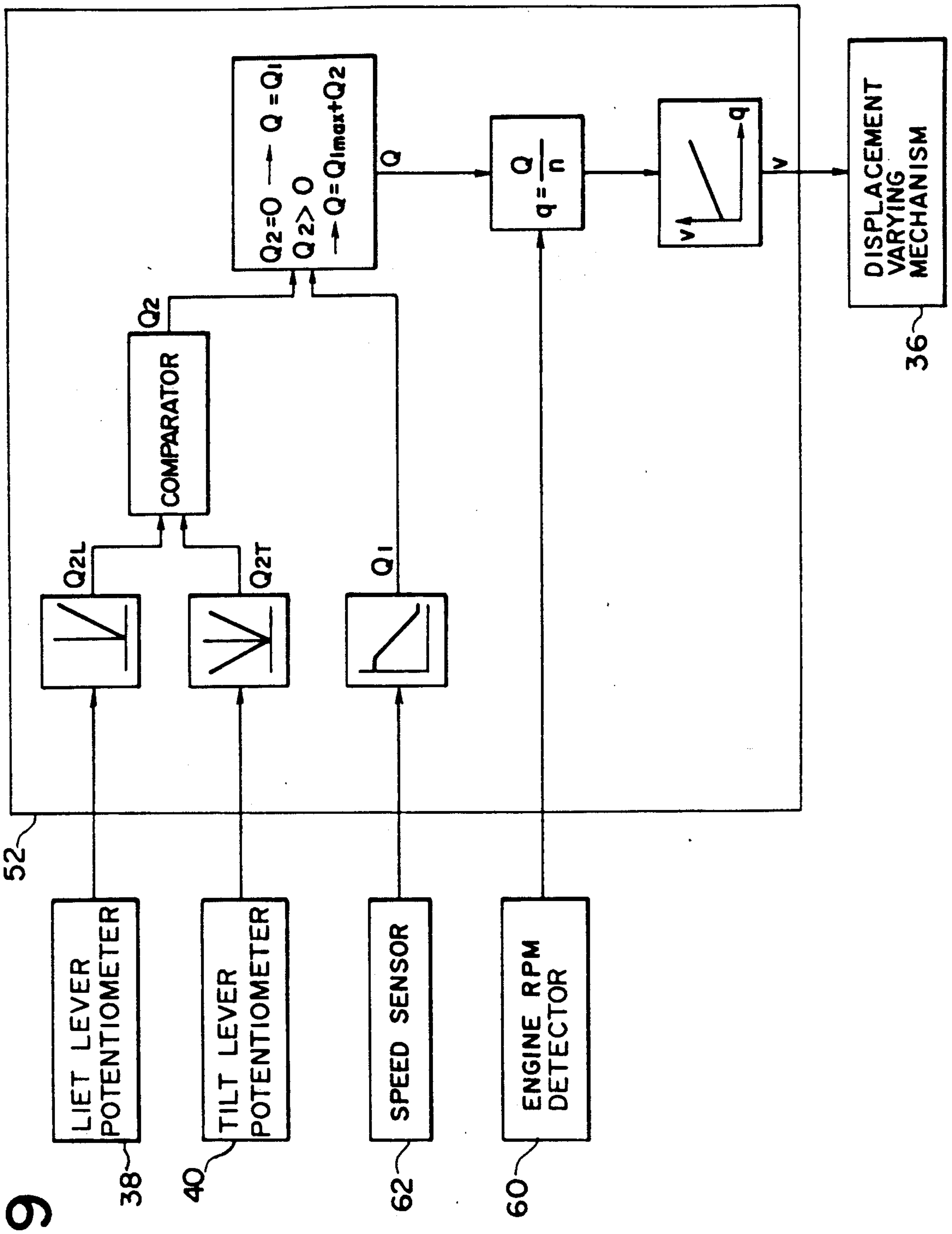
FIG. 9 is a view schematically showing a control logic in a controller of a modified example of the second embodiment.

As shown in FIG. 9, the controller 52 of this modified example receives a signal corresponding to the operating degree of the lift or tilt lever 10 or 12 from the potentiometers 38, 40, and calculates quantities $Q_{2L}$, $Q_{2T}$ required by the lift and tilt cylinders 14 and 16 from the signal. Then, a comparator compares the quantities $Q_{2L}$, $Q_{2T}$, selects the larger of them, and outputs a quantity $Q_2$ necessary for loading/unloading operations. Simultaneously, it converts the singal from the vehicle speed sensor 62 into a vehicle speed and obtains a quantity $Q_1$ required by the driving control system circuit 18 responsive to the vehicle speed. When $Q_2$ is zero, i.e., the control levers 10, 12 are not operated, the quantity Q required by the whole hydraulic apparatus is $Q_1$ obtained previously, and when $Q_2$ is not zero, the necessary quantity Q is obtained by adding $Q_2$ to the maximum quantity ($Q_{1\,max}$ for convenience) to be supplied to the driving control system circuit 18 by the flow divider in the control valve 8. Then, the discharge capacity q per revolution of the hydraulic pump 30 is calculated by a signal from an engine rpm detector 60 similarly to the control logic shown in FIG. 8, and the control signal v is output to the displacement varying mechanism 36 in accordance with the discharge capacity q.

When only a steering operation is executed, the quantity $Q_2$ necessary for loading/unloading operations is zero. Accordingly, only the quantity $Q_1$ required by the driving control system circuit 18 responsive to the vehicle speed in this case is discharged from the hydraulic pump 30, and all the quantity $Q_1$ of the hydraulic fluid is supplied from the flow divider into the driving control system circuit 18. Therefore, the quantity of hydraulic fluid to be supplied to the power steering gear box 24 when the vehicle travels at high speed is kept to a small value, inhibiting abrupt steering operations to prevent the vehicle from overturning due to a high speed turning movement.

When only loading/unloading operations are executed, the quantity Q obtained by adding the quantity $Q_{1\ max}$ supplied to the driving control system circuit 18 to the quantity $Q_2$ necessary for the loading/unloading operations becomes the discharge quantity $Q_0$ of the hydraulic pump 30. In this case, since the hydraulic fluid of the quantity $Q_{1\ max}$ is always supplied by the flow divider to the driving control system circuit 18, the vehicle can be smoothly shifted from loading/unloading operations to steering operations. In the embodiment described above, the flow divider is of the fixed flow type. However, a flow divider having a flow regulating mechanism for regulating the quantity $Q_1$ to the driving control system circuit 18 may be employed. The quantity $Q_1$ to the driving control system circuit 18 can be regulated at the time of loading/unloading operations by using this variable flow type flow divider. In other words, when driving operations are executed together with the loading/unloading operations, since only the quantity of the hydraulic fluid necessary for driving can be supplied to the driving control system circuit 18, the discharge quantity $Q_0$ of the hydraulic pump 30 becomes a quantity obtained by adding the quantity $Q_2$ necessary for loading/unloading operations and the quantity $Q_1$ necessary for driving, and excessive quantities can be omitted. When the discharge quantity of the pump is at maximum, the quantity $Q_2$ of the hydraulic fluid for loading/unloading operations can be increased by $(Q_{1\ max}-Q_1)$.

As means for detecting the operating degrees of the control levers 10, 12 means other than the potentiometers may be considered. For example, limit switches may be employed instead of the potentiometers. In this case, when the lever is moved a predetermined degree to conduct loading/unloading operations, the limit switch is closed, the controller 52 receives its signal and generates a control signal to maximize the discharge capacity q per revolution of the hydraulic pump 30 to the displacement varying mechanism 36. When there are no loading/unloading operations being executed, the limit switch remains open, and since the controller 52 controls the hydraulic pump 30 so as to minimize the discharge capacity q, wasteful returning of the hydraulic fluid does not occur except at the time of loading/unloading operations. This is shown in FIG. 10.

Figure 10:
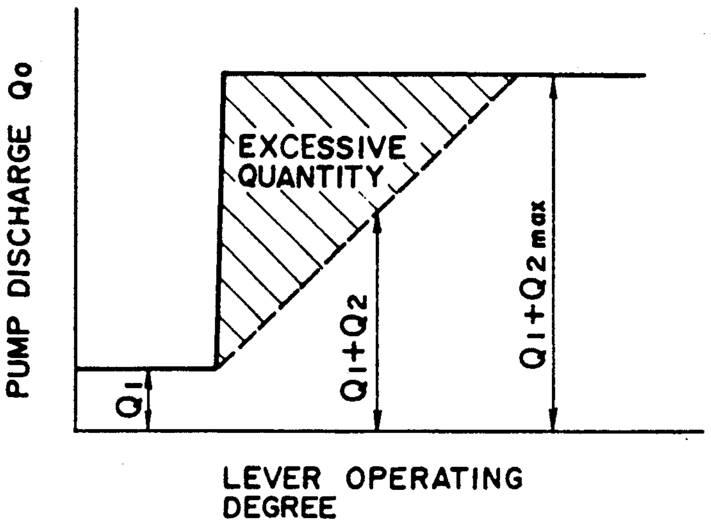
FIG. 10 is a graph showing the relationship between a lever operating degree and the discharge quantity of a pump when a limit switch is used as the lever operating degree sensor.

However, if only one limit switch is provided for loading/unloading control levers 10 and 12, the discharge quantity $Q_0$ can only be regulated in two stages of large and small quantities as understood from FIG. 10, so that excessive quantity will be generated when the quantity $Q_2$ necessary for the loading/unloading operations is small. Therefore, providing a plurality of limit switches to switch the discharge quantity $Q_0$ of the hydraulic pump in multiple stages, may be readily understood by those skilled in the art to be more effective.

Figure 11:
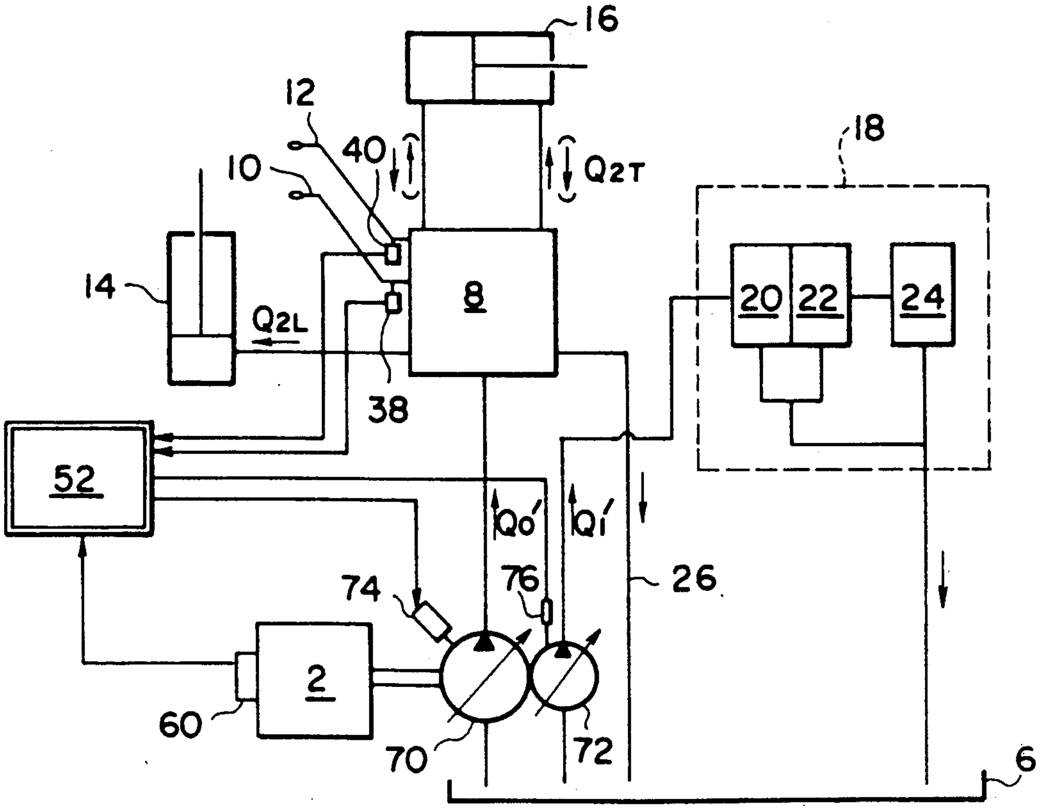
FIG. 11 is a circuit diagram of this invention when applied to a hydraulic apparatus for a fork lift truck using a tandem type hydraulic pump.

FIG. 11 shows a third embodiment of the present invention which is applied to a hydraulic apparatus in which a tandem type hydraulic pump is employed. A tandem type hydraulic pump refers to a large and a small hydraulic pump 70 and 72 to be driven by the same engine 2, the hydraulic pump 70 of large displacement being connected to the control unit 8. The driving control system circuit 18 is connected to the hydraulic pump 72 of small displacement. These hydraulic pumps 70 and 72 are both variable displacement types. An engine rpm detector 60 for detecting the rpm of the engine is provided in the engine 2.

Figure 12:
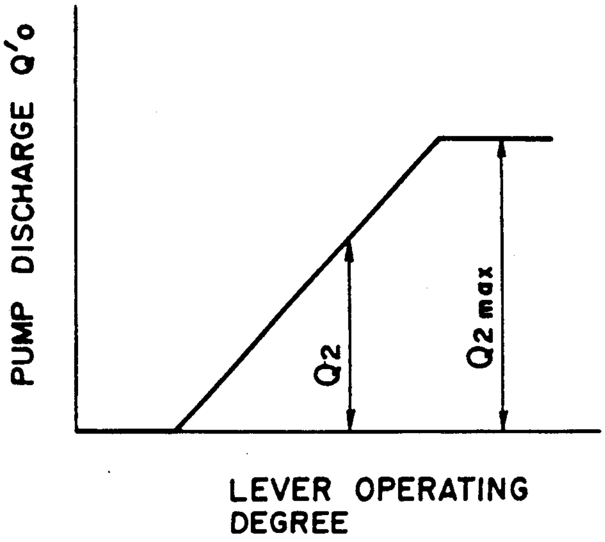
FIG. 12 is a graph showing the relationship between a lever operating degree and the discharge quantity of the large displacement hydraulic pump of FIG. 11.
Figure 13:
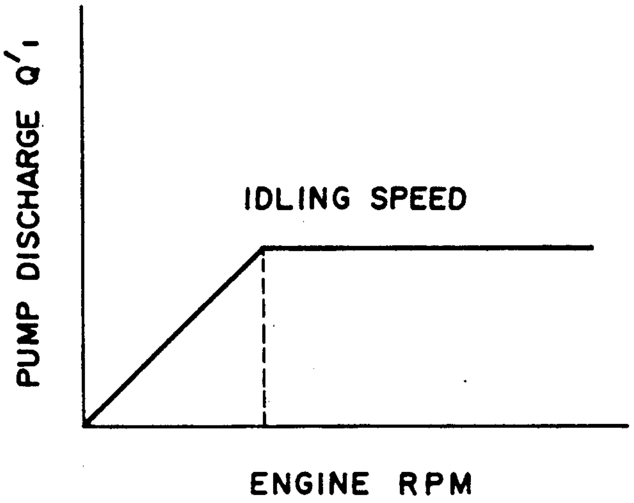
FIG. 13 is a graph showing the relationship between the rpm of an engine and the discharge quantity the small capacity hydraulic pump of FIG. 11.

With the arrangement described above, the controller 52 reads out the rpm of the engine 2 and the operating degree of the levers from the engine rpm detector 60 and the potentiometers 38, 40, respectively, and controls the discharge quantities $Q'_0$, $Q'_1$ of the hydraulic pumps 70, 72. More specifically, since the hydraulic pump 70 of large displacement is used exclusively for loading/unloading operations, the discharge quantity $Q'_0$ of the hydraulic pump 70 is, when loadin/unloading operations are not conducted, limited to zero or minimum. The displacement varying mechanism 74 is controlled in response to the operating degree of the control levers 10, 12 and the rpm of the engine as described above at the time of loading/unloading operations to increase the discharge quantity $Q'_0$. Since the hydraulic pump 72 of small displacement is used exclusively for the driving control system circuit, when the engine 2 reached a set rpm such as an idling rpm or more, the displacement varying mechanism 76 of the hydraulic pump 72 is controlled according to the rpm of the engine so that its discharge quantity $Q'_1$ is maintained constantly at a predetermined value. FIG. 12 shows the relationship between the operating degree of the lever and the discharge quantity $Q'_0$ of the hydraulic pump 70 of large displacement, and FIG. 13 shows the relationship between the rpm of the engine and the discharge quantity $Q'_1$ of the hydraulic pump 72 of small displacement. With the arrangement described above, since the flow divider can be eliminated, pressure loss can be reduced, and this has such an advantage that the efficiency of the hydraulic system can be further improved.

Figure 14:
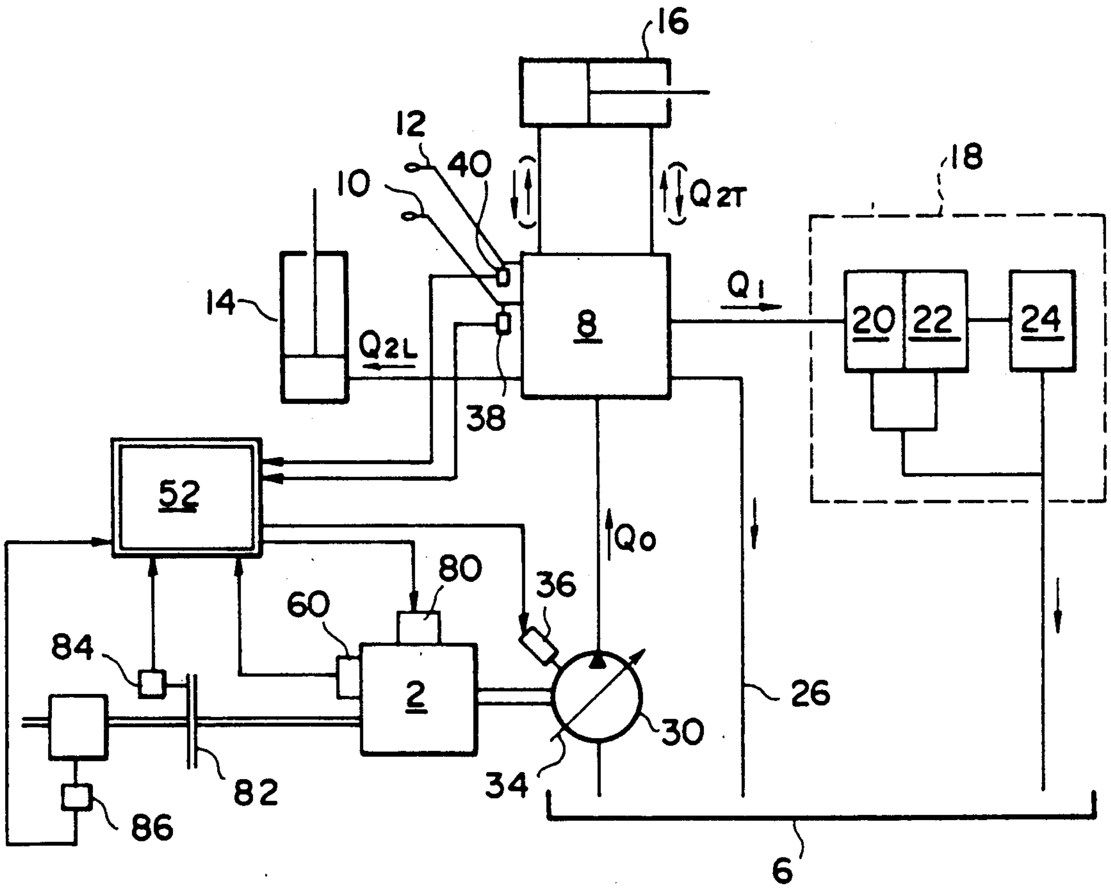
FIG. 14 is a circuit diagram of a hydraulic apparatus for a fork lift truck to which another embodiment of this invention is applied.

FIG. 14 shown a hydraulic apparatus for a fork lift truck in which still another embodiment to the present invention is applied. This hydraulic apparatus has substantially the same arrangement as that of the hydraulic apparatus shown in FIG. 3, but it is different from that shown in FIG. 3 in the points of providing a throttle actuator 80 attached to the engine 2, a clutch ON-OFF sensor 84 for detecting the ON-OFF of the clutch 82, a neutral sensor 86 for detecting whether or not a transmission (not shown) is in neutral, and an engine rpm detector 60. The clutch ON-OFF detector 84, the neutral sensor 86 and the engine rpm detector 60 are connected to the input unit of the controller 52. The throttle actuator 80 is connected to the output unit of the controller 52.

Figure 15:
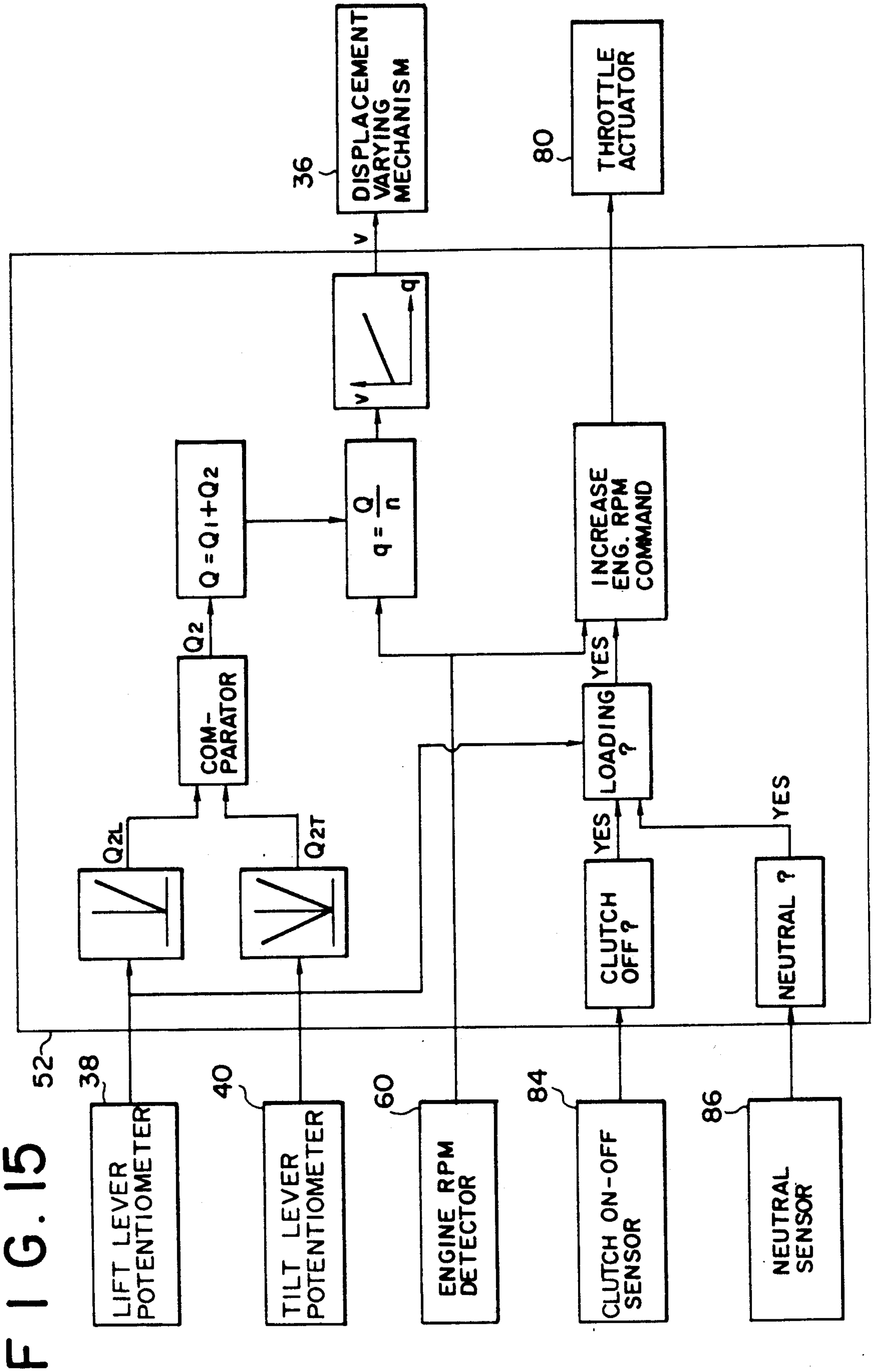
FIG. 15 is a view schematically showing a control logic in a controller shown in FIG. 14.

As shown in FIG. 15, the controller 52 receives a signal corresponding to the operating degree of the levers from potentiometers 38 and 40 to determine a quantity $Q_2$ necessary for loading/unloading operations, inputs the actual rpm n from the engine rpm detector 60, and calculates a discharge capacity q per revolution of the hydraulic pump 30. The controller 52 also determines whether or not the clutch 82 is ON and the transmission is in neutral according to signals from the clutch ON-OFF sensor 84 and the neutral sensor 86. If the clutch 82 is ON and the transmission is not in neutral, the controller 52 generates a control signal v corresponding to the discharge capacity q calculated previously to the displacement varying mechanism 36 similar to the embodiment of FIG. 3 to control the quantity of the hydraulic pump 30. On the other hand, if the clutch 82 is OFF or the transmission is in neutral, and the loading/unloading control levers 10 and 12 are tilted, the controller 52 outputs an engine rpm increase command to the throttle actuator 80 to raise the rpm of the engine 2, and maintain the engine 2 at the rpm when the detected value from the engine rpm detector 60 reaches a predetermined value. This rpm is preferably set to a reference rpm $n_0$ necessary for the loading/unloading operations. The controller 52 also generates the engine rpm increase command to the throttle actuator 80 and simultaneously generates a control signal v responsive to the operating degree of the levers to the displacement varying mechanism 36 to increase the discharge quantity $Q_0$ of the hydraulic pump 30. Thus, when the loading/unloading operations are executed while the vehicle is stopped, the rpm of the engine 2 can be automatically raised merely by tilting the control levers 10 and 12 even if the accelerator pedal is not depressed to perform the necessary loading/unloading operations.

According to the present invention as described above, since the discharge quantity of the hydraulic pump is increased in the quantity necessary for the loading/unloading operations when loading/unloading operations are performed, excessive hydraulic fluid flowing in the hydraulic apparatus is reduced. Accordingly, flow loss and pressure loss are remarkably reduced, the efficiency of the hydraulic system is raised, and fuel consumption is improved. Since the temperature rise of the hydraulic fluid is also suppressed, various types of troubles due to hydraulic fluid temperature rise such as packing and seal deterioration, pump wear, deterioration of hydraulic fluid, etc. can be prevented, they improving the lifetime of hydraulic components and the reliability of the whole vehicle.

The tilt and lift control levers may be replaced by control levers of attachments for other special work. If there are more than two control levers, the required quantity is obtained from the control lever with the largest operating degree.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A hydraulic fluid flow control apparatus used for a hydralic system for an industrial vehicle having a hydraulic pump driven by an engine, at least one loading-/unloading hydraulic unit, a control valve for supplying or discharging hydraulic fluid to be pumped by said hydraulic pump from or to said loading/unloading hydraulic unit, a control lever for operating said control valve, a driving control system circuit, and a fixed flow type flow divider connected to the discharge port of said hydraulic pump, said fixed flow type flow divider having a fixed flow outlet to which said driving control system circuit is connected and an excessive quantity outlet to which said control valve is connected, said hydraulic fluid flow control apparatus comprising:

a variable displacement type hydraulic pump;

a lever operating degree detector for detecting the degree of operation of said control lever;

a vehicle speed sensor;

a controller for determining a quantity of hydraulic fluid necessary for loading/unloading operations and required by said driving control system circuit based on a signal from said lever operating degree detector and said vehicle speed sensor, determining a discharge capacity of hydraulic fluid per revolution of said hydraulic pump so as to increase the discharge quantity of hydraulic fluid from said hydraulic pump by said determined quantity and outputting a signal corresponding to said determined discharge capacity; and means for varying the discharge capacity of hydraulic fluid per revolution of said hydraulic pump based on a singal from said controller so as to obtain said determined discharge capacity, wherein said controller determines a quantity of hydraulic fluid required by said driving control system circuit based on a signal from said vehicle speed sensor, determines the presence or absence of loading/unloading operations based on a signal from said lever operating degree detector, determines a discharge quantity of hydraulic fluid from said hydraulic pump, when the loading/unloading operations are being executed, by adding a quantity necessary for the loading/unloading operations to a maximum quantity of hydraulic fluid required by said driving control system circuit, and determines a discharge quantity of hydraulic fluid from said hydraulic pump, when the loading/unloading operations are not being executed, as said determined quantity required by said driving control system circuit.

2. A hydraulic fluid flow control apparatus according to claim 1, wherein said controller determines the discharge capacity of hydraulic fluid per revolution of said hydraulic pump based on a predetermined reference speed of said engine.

3. A hydraulic fluid flow control apparatus according to claim 1, further comprising a detector for detecting the speed of said engine, wherein said controller determines the discharge capacity of hydraulic fluid per revolution of said hydraulic pump based on a signal from said engine speed detector.

4. A hydraulic fluid flow control apparatus according to claim 3, wherein said hydraulic pump is a first pump for loading/unloading, and further comprising a second variable displacement type hydraulic pump connected at a discharge port thereof to said driving control system circuit and coupled in tandem to said first pump, wherein said controller determines a discharge capacity of hydraulic fluid per revolution of said second pump so that a discharge quantity of hydraulic fluid from said second pump becomes a quantity required by said driving control system circuit, and outputs a signal corresponding to said determined discharge capacity, said second pump comprising means for varying the discharge capacity per revolution of said second pump based on a signal from said controller to obtain said determined discharge capacity.

5. A hydraulic fluid flow control apparatus according to claim 1, wherein said industrial vehicle has a plurality of hydraulic units and said controller selects the largest of quantities of hydraulic fluid required by said hydraulic units as a quantity necessary for loading/unloading operations.

6. A hydraulic fluid flow control apparatus according to claim 1, wherein said lever operating degree detector is a potentiometer operatively associated with said control lever.

7. A hydraulic fluid flow control apparatus according to claim 1, wherein said lever operating degree detector is a limit switch for detecting when said control lever moves a predetermined distance.

8. A hydraulic fluid flow control apparatus according to claim 1, further comprising means for detecting an fluid temperature, and means for detecting an fluid pressure, wherein said controller includes means for compensating a variation of a volume of the hydraulic fluid based on variations of the detected fluid temperature and fluid pressure.

9. A hydraulic fluid flow control apparatus used for a hydraulic system for an industrial vehicle having a hydraulic pump, an engine for driving said hydraulic pump, a transmission for converting the output of said engine into driving power of the vehicle, a clutch for connecting or turning on, or disconnecting or turning off power between said engine and said transmission, at least one loading/unloading hydraulic unit, and a control valve for supplying or discharging hydraulic fluid to be pumped by said hydraulic pump from or to said loading/unloading hydraulic unit, and a control lever for operating said control valve, said hydraulic fluid flow control apparatus comprising:

a variable displacement type hydraulic pump a lever operating degree detector for detecting the degree of operation of said control levers;

an engine speed detector for detecting the speed of said engine;

a clutch ON-OFF detector for detecting the ON-OFF state of said clutch;

a neutral detector for detecting when said transmission is in neutral;

a controller for determining a quantity of hydraulic fluid necessary for loading/unloading operations based on a signal from said lever operation degree detector, determining a discharge capacity of hydraulic fluid per revolution of said hydraulic pump so as to increase the discharge quantity of hydraulic fluid from said hydraulic pump by said determined quantity, outputting a signal corresponding to said determined discharge capacity, and outputting a signal for raising the speed of said engine to a predetermined value based on signals from said engine speed detector and said lever operating degree detector when said controller determines based on signals from said clutch ON-OFF detector or said neutral detector and said lever operating degree detector that said clutch is OFF or said transmission is in neutral and that said control lever is being operated;

means for varying the discharge capacity of hydraulic fluid per revolution of said hydraulic pump based on a signal from said controller so as to obtain said determined discharge capacity; and a throttle actuator for regulating fuel supplied to said engine so as to raise the speed of said engine to a predetermined value based on a signal from said controller.

10. A hydraulic fluid flow control apparatus according to claim 9, wherein said industrial vehicle has a plurality of hydraulic units and said controller selects the largest of quantities of hydraulic fluid required by said hydraulic units as a quantity necessary for loading/unloading operations.

11. A hydraulic fluid flow control apparatus according to claim 9, wherein said lever operating degree detector is a potentiometer operatively associated with said control lever.

12. A hydraulic fluid flow control apparatus according to claim 9, wherein said lever operating degree detector is a limit switch for detecting when said control lever moves a predetermined distance.

13. A hydraulic fluid flow control apparatus according to claim 9, further comprising a fixed flow type flow divider disposed between said control valve and said hydraulic pump, and a driving control system circuit connected to the fixed flow outlet of said flow divider, said control valve connected to the excessive quantity outlet of said flow divider, wherein when loading/unloading operations are not being executed, the discharge quantity of hydraulic fluid from said hydraulic pump is an only quantity for said driving control system circuit.

14. A hydraulic fluid flow control apparatus according to claim 13, further comprising a vehicle speed sensor, wherein said controller determines a quantity of hydraulic fluid required by said driving control system circuit based on a signal from said vehicle speed sensor, determines the presence or absence of loading/unloading operations based on a signal from said lever operating degree detector, determines a discharge quantity of hydraulic fluid from said hydraulic pump, when the loading/unloading operations are being executed, by adding a quantity necessary for the loading/unloading operations to a maximum quantity of hydraulic fluid required by said driving control system circuit, and determines a discharge quantity of hydraulic fluid from said hydraulic pump, when the loading/unloading operations are not being executed, as said determined quantity required by said driving control system circuit.

15. A hydraulic fluid flow control apparatus according to claim 9, wherein said hydraulic pump is a first pump for loading/unloading, and further comprising a second variable displacement type hydraulic pump connected at a discharge port thereof to said driving control system circuit and coupled in tandem to said first pump, wherein said controller determines a discharge capacity of hydraulic fluid per revolution of said second pump so that a discharge quantity of hydraulic fluid from said second pump becomes a quantity required by said driving control system circuit, and outputs a signal corresponding to said determined discharge capacity, said second pump comprising means for varying the discharge capacity per revolution of said second pump based on a signal from said controller to obtain said determined discharge capacity.

16. A hydraulic fluid flow control apparatus according to claim 9, further comprising means for detecting a fluid temperature, and means for detecting a fluid pressure, wherein said controller includes means for compensating a variation of a volume of the hydraulic fluid based on variations of the detected fluid temperature and fluid pressure.

* * * * *

UNITED STATES PATENT AND TRADEMARK OFFICE

CERTIFICATE OF CORRECTION

PATENT NO. : 5,050,379

DATED : September 24, 1991

INVENTOR(S) : K. Nagai et al.

It is certified that error appears in the above-identified patent and that said Letters Patent is hereby corrected as shown below:

Title page: In item (54) and in,

Col. 1, line 3, "DISPLACEMET" should read --DISPLACEMENT--.

Col. 2, line 9, "acclerator" should read --accelerator--.

Col. 5, line 1, "tus" should read --atus--.

Col. 5, line 9, "Indicator" should read --indicator--.

Col. 5, lines 48 - 49, "Q21" should read --Q2L--.

Col. 6, lines 35 - 36, "acceleration" should read --accelerator--.

Col. 6, line 39, "effeciciency" should read --efficiency--.

Col. 7, line 49, "12" should read --12,--.

Col. 8, line 35, "reached" should read --reaches--.

UNITED STATES PATENT AND TRADEMARK OFFICE
CERTIFICATE OF CORRECTION

PATENT NO. : 5,050,379

DATED : September 24, 1991

INVENTOR(S) : K. nagai, et al.

It is certified that error appears in the above-identified patent and that said Letters Patent is hereby corrected as shown below:

Column 9, line 62, "hydralic" should read --hydraulic--.

Signed and Sealed this

Twenty-third Day of March, 1993

*Attest:*

STEPHEN G. KUNIN

*Attesting Officer*

*Acting Commissioner of Patents and Trademarks*